United States Patent
Shah et al.

(10) Patent No.: US 7,726,974 B2
(45) Date of Patent: Jun. 1, 2010

(54) MAGNETIC POWER AND DATA COUPLING FOR LED LIGHTING

(75) Inventors: Ashok Deepak Shah, Atlanta, GA (US); David Diehl Roberts, III, Birmingham, AL (US)

(73) Assignee: Illumitron International, Atlanta, GA (US)

( * ) Notice: Subject to any disclaimer, the term of this patent is extended or adjusted under 35 U.S.C. 154(b) by 0 days.

(21) Appl. No.: 12/408,464

(22) Filed: Mar. 20, 2009

(65) Prior Publication Data

US 2009/0239393 A1 Sep. 24, 2009

Related U.S. Application Data

(60) Provisional application No. 61/038,211, filed on Mar. 20, 2008.

(51) Int. Cl.
*H01R 13/60* (2006.01)

(52) U.S. Cl. .......................................................... 439/40

(58) Field of Classification Search ............ 439/37–40, 439/505, 519, 913; 361/733
See application file for complete search history.

(56) References Cited

U.S. PATENT DOCUMENTS

| | | | |
|---|---|---|---|
| 3,363,214 A * | 1/1968 | Wright ........................ 439/39 |
| 6,244,733 B1 | 6/2001 | Fong et al. |
| 6,598,991 B2 | 7/2003 | Altman |
| 6,720,745 B2 | 4/2004 | Lys et al. |
| 6,796,680 B1 | 9/2004 | Showers et al. |
| 6,965,205 B2 | 11/2005 | Piepgras et al. |
| 7,132,804 B2 | 11/2006 | Lys et al. |
| 7,137,727 B2 | 11/2006 | Joseph et al. |
| 7,161,313 B2 | 1/2007 | Piepgras et al. |
| 7,178,941 B2 | 2/2007 | Roberge et al. |
| 7,186,003 B2 | 3/2007 | Dowling et al. |
| 7,221,104 B2 | 5/2007 | Lys et al. |
| 7,311,526 B2 | 12/2007 | Rohrbach et al. |
| 7,344,379 B2 | 3/2008 | Marmaropoulos et al. |
| 7,467,948 B2 * | 12/2008 | Lindberg et al. ............ 439/38 |
| 2007/0253195 A1 | 11/2007 | Dietz |

FOREIGN PATENT DOCUMENTS

WO   WO 2005/104304   11/2005

OTHER PUBLICATIONS

The International Search Report and The Written Opinion of the International Searching Authority, or the Declaration dated Jun. 4, 2009 of the co-pending PCT Application, Serial No. PCT/US09/37840 filed Mar. 20, 2009.

* cited by examiner

*Primary Examiner*—Chandrika Prasad
(74) *Attorney, Agent, or Firm*—Hope Baldauff Hartman, LLC

(57) ABSTRACT

Technologies are described herein for a conductive magnetic coupling system. The system includes a signal supply component that provides electrical and/or data signals to a signal consumption component that utilizes the signal to provide an output. The two components are magnetically coupled together such that the magnetic coupling mechanisms not only provide the bonding mechanism for securing the components to one another, but also provide the electrical and communicative continuity that allows for the transfer of electrical and/or data signals between the two components. Aspects provide for the repositioning of the signal consumption component along any section of a signal supply component configured as a magnetic track system. Aspects further provide for a flexible, fluid impermeable signal supply component in which a signal consumption component is repositionable along its length.

20 Claims, 13 Drawing Sheets

MAGNETIC POWER AND DATA COUPLING FOR LED LIGHTING

CROSS-REFERENCE TO RELATED APPLICATION

This application claims the benefit of U.S. provisional patent application Ser. No. 61/038,211 entitled "INTELLIGENT ILLUMINATION AND ENERGY MANAGEMENT SYSTEM" filed on Mar. 20, 2008, which is expressly incorporated herein by reference. This patent application is also related to and filed with U.S. patent application Ser. No. 12/408,503, entitled "MANAGING SSL FIXTURES OVER PLC NETWORKS," Ser. No. 12/408,499, entitled "ENERGY MANAGEMENT SYSTEM," and Ser. No. 12/408,463, entitled "ILLUMINATION DEVICE AND FIXTURE," each of which was filed on Mar. 20, 2009 and is assigned to the same assignee as this application. The aforementioned patent applications are expressly incorporated herein, in their entirety, by reference.

TECHNICAL FIELD

The present invention relates generally to the field of electrical and communicative coupling and, more particularly, to a conductive magnetic coupling system for coupling electronic components.

BACKGROUND

Advances in lighting technology has led to the replacement of various types of conventional light bulbs with light-emitting diodes (LEDs). The use of LEDs can reduce energy consumption and provide an increased life span, when compared with many conventional bulbs. For these reasons and others, LEDs are increasingly used in a wide range of applications, such as within automobiles, computers, and a large number of electronics.

However, LEDs have not historically been used in many home and business applications where conventional incandescent and fluorescent light bulbs are most commonly used. One of the reasons for this is cost. Traditional light bulbs are inexpensive and easily replaced. When a traditional bulb expires, it is easily removed from a base and replaced with a new bulb. However, there are no conventional LED "bulbs" that may be used to replace an incandescent or fluorescent bulb in an existing feature. Rather, due to their small size, LEDs are often mounted in an array on a circuit board and hard-wired into the particular application, such within a traffic light or brake light fixture of an automobile. Replacing LED arrays typically involves replacing an entire fixture rather than a single "bulb," which can be cumbersome and expensive.

While fluorescent light technology has been adapted into a compact fluorescent lamp form in which a fluorescent light may be used with a conventional Edison screw base fitting, LED lighting systems have not. One of the reasons for this is that technology used to control LED lighting is not fully compatible with Edison screw base fittings. For example, dimming LEDs involves utilizing pulse width modulation, which is difficult to perform using an Edison screw base. In addition to a modular and easily configurable LED lighting system, a modular coupling system that allows for the simplified removal, replacement, and reconfiguration of any electrical component that receives electricity and/or data would be desirable.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

According to one aspect of the disclosure, a conductive magnetic coupling system includes a power supply component and a power consumption component. The power supply component includes a mechanism that connects to, and provides an electrical signal to, the power consumption component. The power consumption component includes a corresponding mechanism that connects to the power supply component and receives the electrical signal. At least one of these coupling mechanisms includes a magnet that is electrically conductive so that the magnet functions both as a bonding agent and an electrical contact. The power consumption component additionally includes a device that receives and uses the electrical signal to provide an output, such as light.

According to another aspect, a conductive magnetic coupling system includes a power consumption component and a power supply component with a number of parallel tracks. Each track is structured to provide an electrical signal to the power consumption component when magnetically connected to the tracks. The power consumption component may receive the electrical signal via the magnetic connection while connected to any portion of the tracks. In this manner, an LED light or any other electrical component may be magnetically coupled and electrically connected to a track at any desired position by simply placing the magnetic contacts of the component against the tracks at the desired location.

In a further aspect, a conductive magnetic coupling system includes a power supply component having a number of parallel electrical conductors encompassed by a flexible insulator. A power consumption component includes one or more devices that penetrate the insulator to contact the conductors. Once the penetration devices contact the conductors, an electrical signal may be routed to a power consumption device such as an LED lighting system or other electrical component. A magnetic coupling system secures the power consumption component in place against the power supply component prior to and concurrently with penetration of the insulator with the penetration devices.

Other systems, apparatuses, and methods according to embodiments will be or become apparent to one with skill in the art upon review of the following drawings and Detailed Description. It is intended that all such additional systems, apparatuses, and/or methods be included within this description, be within the scope of the present disclosure, and be protected by the accompanying claims.

DETAILED DESCRIPTION

Figure 1:
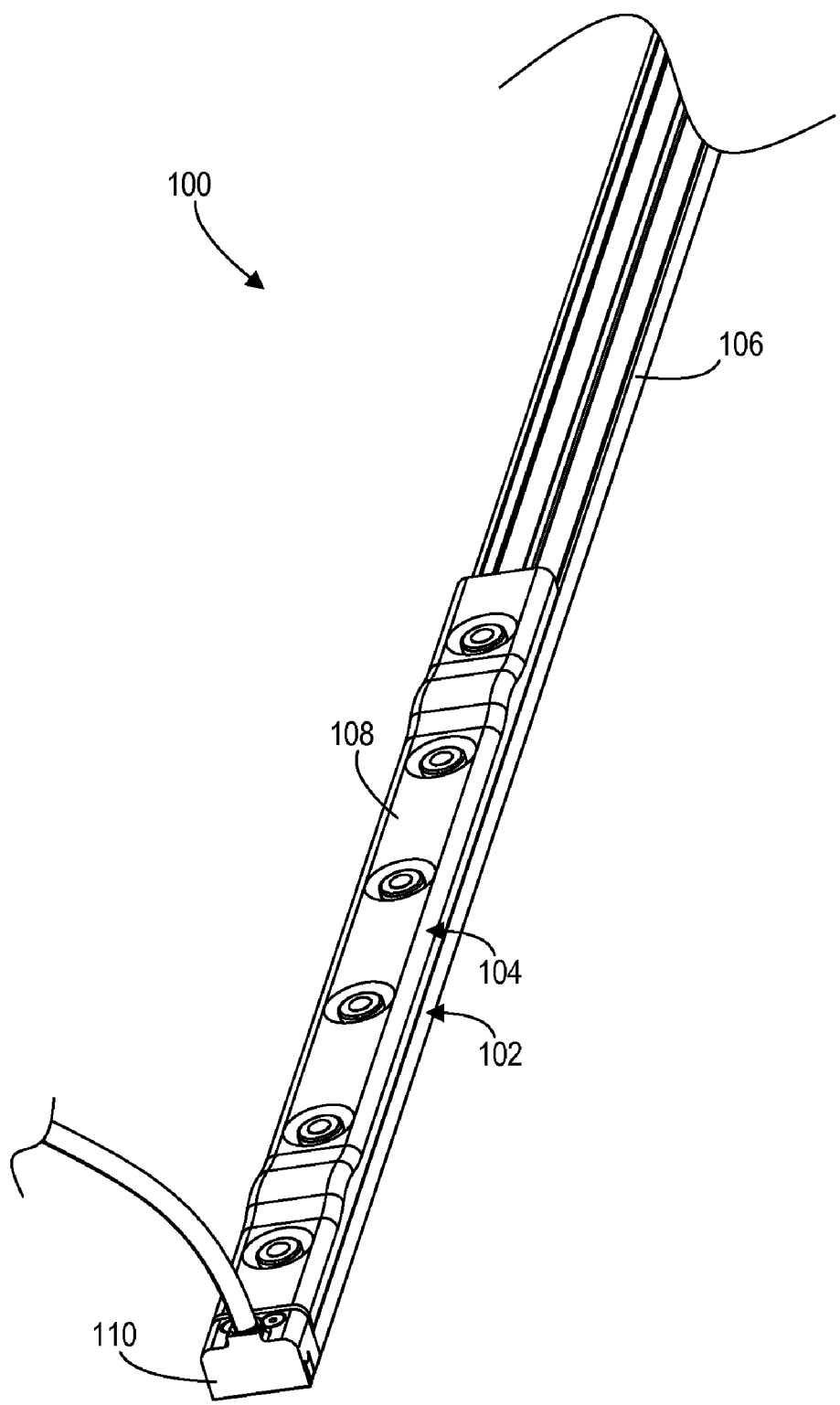
FIG. 1 is a perspective view of a conductive magnetic coupling system showing a power consumption component magnetically and electrically coupled to a power supply component according to various embodiments described herein.

The following detailed description is directed to conductive magnetic coupling systems. As discussed briefly above, due to the high efficiencies and superior life span of LED technology, LED lighting systems could offer long-term savings to general consumers and businesses if the systems were modular, allowing for the creation of LED "bulbs" that could be easily and relatively inexpensively replaced, rather than having to replace an entire fixture or LED unit.

Utilizing the technologies and concepts presented herein, a modular solid state luminary lighting solution, such as a LED lighting system, which may be additionally utilized as a modular coupling system for any other modular electronic components, provides a base power/data supply fixture to which an LED or other unit may be magnetically attached. Electrical and/or data signals are transferred directly through the magnetic connection to the attached receiving device. In addition, embodiments described herein provide an electronic coupling system that provides a user with increased flexibility over existing solutions. Using the embodiments described below, a user can position a light or other component at any location along a track system in a manner that is simplified over even existing track lighting systems. To change bulbs or reposition lighting, a user of the embodiments described herein simply pulls an existing component off of the track, which disengages the magnetic and electrical connections. To replace or move the component, the user simply places the desired component at a desired location on the track to engage the magnetic and electrical connections. There is no need to unscrew, twist, or otherwise disengage male and female components to do so, as is required to remove or replace existing light bulbs. Further, the conductive magnetic coupling systems described herein allow for the transfer of data, pulse width modulation operations, and other communication features to be utilized to control the operations and characteristics of the lighting components.

In the following detailed description, references are made to the accompanying drawings that form a part hereof, and which are shown by way of illustration, specific embodiments, or examples. Referring now to the drawings, in which like numerals represent like elements through the several figures, a conductive magnetic coupling system according to the various embodiments will be described. It should be understood that throughout this disclosure, the various embodiments are described in the context of an LED, or other solid state luminary, lighting system for illustrative purposes. However, the conductive magnetic coupling system described below is equally applicable to any other electronic component in which it would be desirable to detachably connect the component to a power and/or data source quickly and easily via a magnetic connection. Accordingly, the disclosure presented herein is not limited to use with LED or other luminary components.

Turning now to FIG. 1, one embodiment of a conductive magnetic coupling system 100 will be described. With this embodiment and all others described herein, the coupling system 100 includes a power supply component 102 that supplies an electrical signal and/or a data signal to a power consumption component 104, which is magnetically connected to the power supply component 102. The power consumption component 104 transforms the electrical and/or data signal to perform a function, such as illuminating an LED strip or array. Various configurations of power supply components 102 and power consumption components 104 will be described herein according to various embodiments. According to the embodiments shown in FIGS. 1-8, the power supply component 102 includes a track system 106 and the power consumption component 104 includes a LED light strip 108. The LED light strip 108 is magnetically secured to the track system 106 for receiving power and/or data. The conductive magnetic coupling system 100 may be powered and managed using a power and control module 110, which is described in further detail below with respect to FIG. 8.

According to various embodiments, the track system 106 may include tracks of any length that are configured to magnetically couple to any number of corresponding LED light strips 108. While the LED light strip 108 is shown to abut an end of the track system 106, the LED light strip 108 may be placed at any position along the length of the track system 106 not occupied by another LED light strip 108. Similarly, any number of LED light strips 108 may be positioned on the track system 106 such that they abut one another or with any amount of space left between the mounted LED light strips 108. As will become clear from the disclosure herein, the magnetic mechanism for binding the power consumption components 104 to the power supply components 102 allows repositioning of the LED light strips 108 or other components by simply pulling the LED light strip 108 off of the track system 106 and replacing the LED light strip 108 in the desired position, or more quickly, by sliding the LED light strip 108 down the tracks to the desired position on the track system 106.

Looking at FIG. 2, each component of the conductive magnetic coupling system 100 will now be described. According to each embodiment described herein, the power consumption component 104 includes a power receiving coupling mechanism 204 and a power consumption device 202. The power receiving coupling mechanism 204 operates to attach the power consumption component 104 to the power supply component 102 and to transfer electrical and/or data signals between the power supply component 102 and the power consumption device 202. The power consumption device 202 includes the light assembly or other electronic device that is using the electricity to perform a function, such as producing light.

Similarly, the power supply component 102 includes a power distribution coupling mechanism 208 that attaches to the power receiving coupling mechanism 204 to supply power and/or data to the power consumption device 202 from the power and control module 108. According to various embodiments presented herein, the power distribution coupling mechanism 208 and the power receiving coupling mechanism 204 may both be conductive magnets, or one may include conductive magnets while the other includes a metal or other material that is attracted to a magnet and has conductive properties that allows for the transfer of an electrical and/or data signal. Alternatively, the power distribution coupling mechanism 208 may include magnetic coupling mechanisms and separate power leads, while the power receiving coupling mechanism includes magnetic coupling mechanisms and separate power leads such that the magnetic coupling mechanisms of the two components bond them together while the power leads transfer electronic and data signals.

Figure 2:
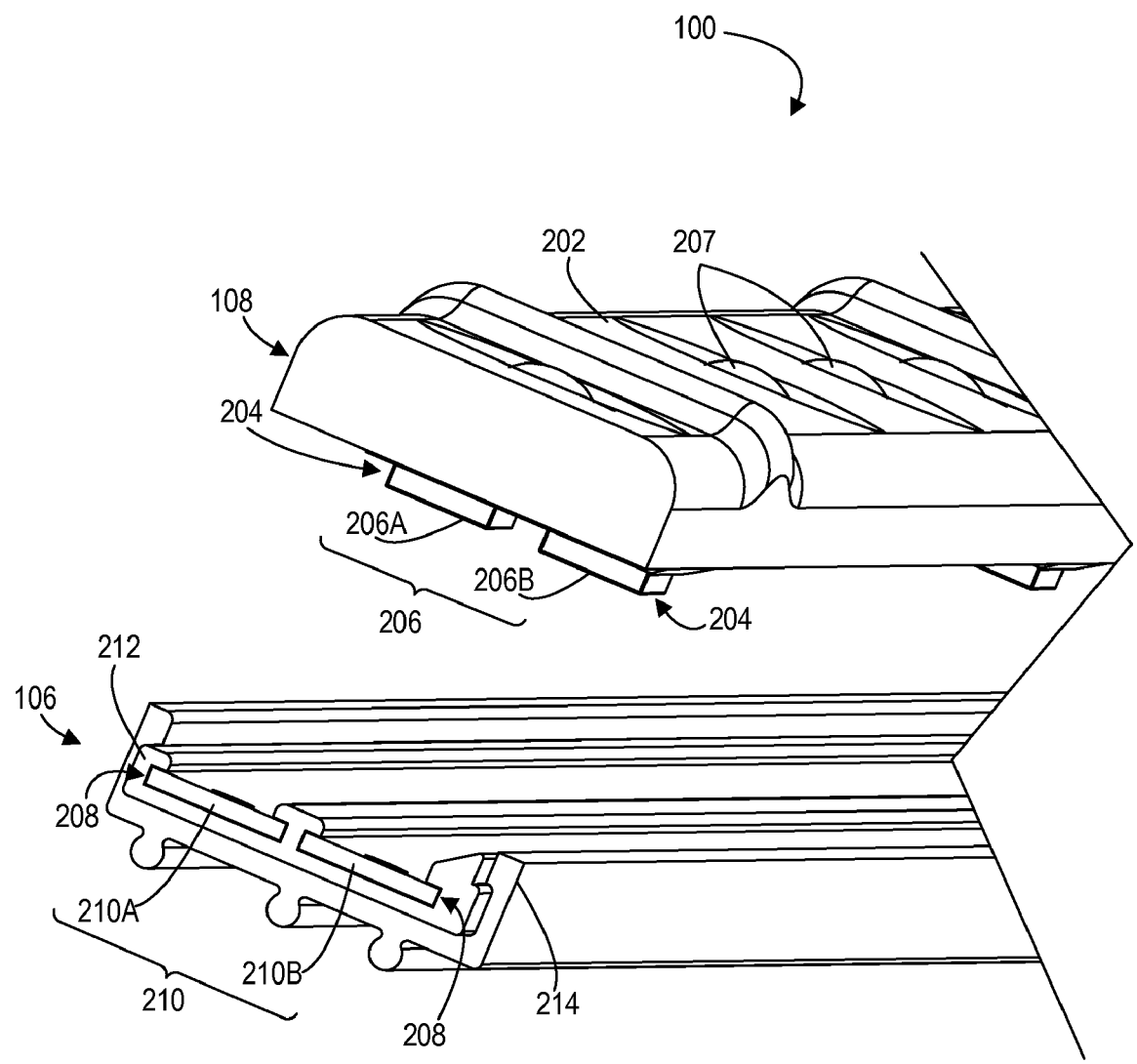
FIG. 2 is a perspective view of the conductive magnetic coupling system of FIG. 1 showing the power consumption component magnetically and electrically decoupled from the power supply component according to various embodiments described herein.

According to the configuration of the conductive magnetic coupling system 100 shown in FIG. 2, the power consumption component 104 includes the LED light strip 108. Conductive magnets 206 function as the power receiving coupling mechanism 204 for receiving power and/or data from the track system 106. Various examples of conductive magnets 206 will be shown and described below with respect to FIGS. 3-5. The power consumption device 202 includes a number of LED assemblies 207 and associated circuitry. Although the LED light strip 108 is shown to include a number of LED assemblies 207 arranged in a linear configuration, it should be understood that any configuration of LED assemblies 207 may be used such that any number of LED assemblies 207 may be arranged in an array of any size and shape within the scope of this disclosure.

According to the configuration shown in FIG. 2, the power supply component 102 includes a track system 106 having two tracks 210 that are also conductive magnets. It should be understood that the track system 106 is not limited to the use of two tracks 210. As will be discussed below with respect to FIG. 8, additional tracks 210 may be used for communication and control between the power supply component 102 and the power consumption component 104 via the power and control module 110. The power supply component 102 may further include a track holder 212 for securing the tracks 210 within a base 214. It should be appreciated that the power supply component 102 is not limited to the configuration shown and that any number and configuration of components may be utilized to support the tracks 210 that are operative to connect with the power receiving coupling mechanism 204 and to supply power and/or data to the power receiving coupling mechanism 204.

As previously mentioned, there are several alternative embodiments for magnetically securing the LED light strip 108 to the track system 106. First, as described above, both the power receiving coupling mechanism 204 and the power distribution coupling mechanism 208, or tracks 210 in the embodiment described here, may be conductive magnets 206. In this embodiment, the polarity of the conductive magnets 206 are aligned such that the exposed pole of the conductive magnet 206A is the same as the conductive magnet track 210B, but opposite of the conductive magnet 206B and of the conductive magnet track 210A. In this manner, the conductive magnetic coupling system 100 limits the attachment of the LED light strip 108 to the track system 106 to a single orientation that to properly route direct current (DC) through the LED assemblies 207.

For example, in the conductive magnetic coupling system 100 shown in FIG. 2, assume that conductive magnet 206A and conductive magnet track 210B are configured as having exposed north poles, while conductive magnet 206B and conductive magnet track 210A are configured with an exposed south pole. The north pole of conductive magnet 206A is attracted to the south pole of conductive magnet track 210A, but repels the north pole of conductive magnet track 210B. Similarly, the south pole of conductive magnet 206B is attracted to the north pole of conductive magnet track 210B, but repels the north pole of conductive magnet tack 210A. In this manner, the LED light strip 108 can only be connected to the track system 106 in the orientation shown. If the LED light strip 108 is rotated 180 degrees, then the magnets 206B and 210A would repel one another, as would magnets 206A and 210B.

An alternative embodiment for magnetically securing the LED light strip 108 to the track system 106 includes using conductive magnets on either the power supply component 102 or the power consumption component 104, and then using a conductive material such as steel or other metal that is attracted to a magnet on the other component. For example, looking at FIG. 2, the power receiving coupling mechanism 204 may include conductive magnets 206A and 206B, while the power distribution coupling mechanism 208 includes steel tracks 210A and 210B. In this embodiment, the conductive magnets 206A and 206B are attracted to the steel tracks 210A and 210B, respectively, and electrical signals and data signals can be transferred between the steel tracks 210A and 210B and the LED assemblies 207 through the conductive magnets 206A and 206B. Similarly, in yet another alternative embodiment, the power receiving coupling mechanism 204 may include steel or another conductive material that is attracted to the power distribution coupling mechanism 208, which includes conductive magnet tracks 210A and 210B.

Figure 3:
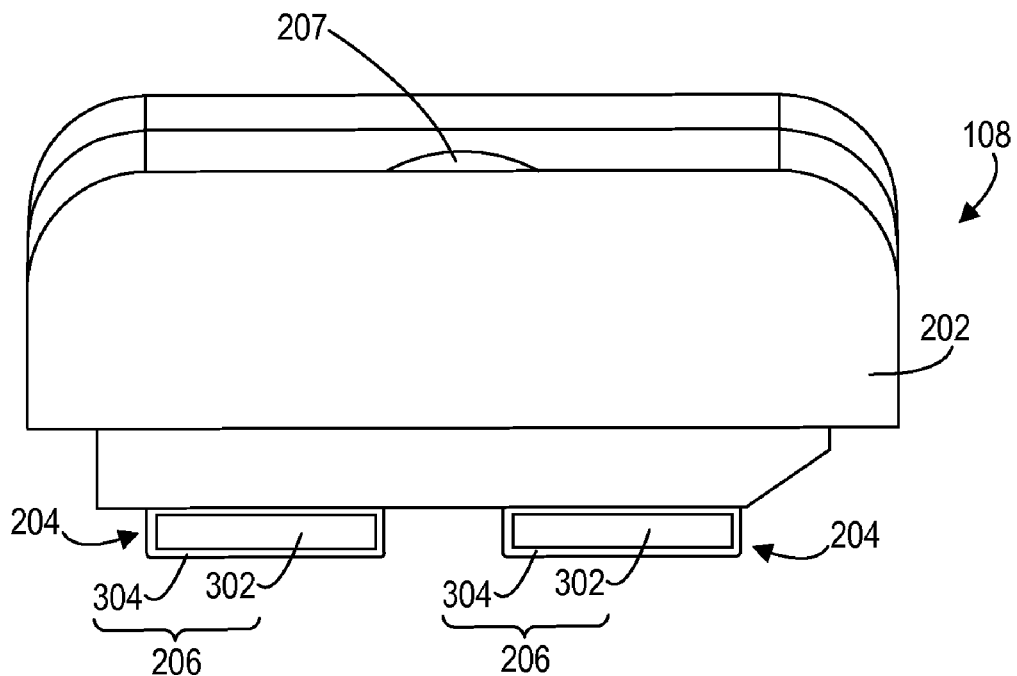
FIG. 3 is a cross-sectional view of a power consumption component showing an electrically conductive magnet in which a magnet is coated with a conductive material according to various embodiments described herein.
Figure 4:
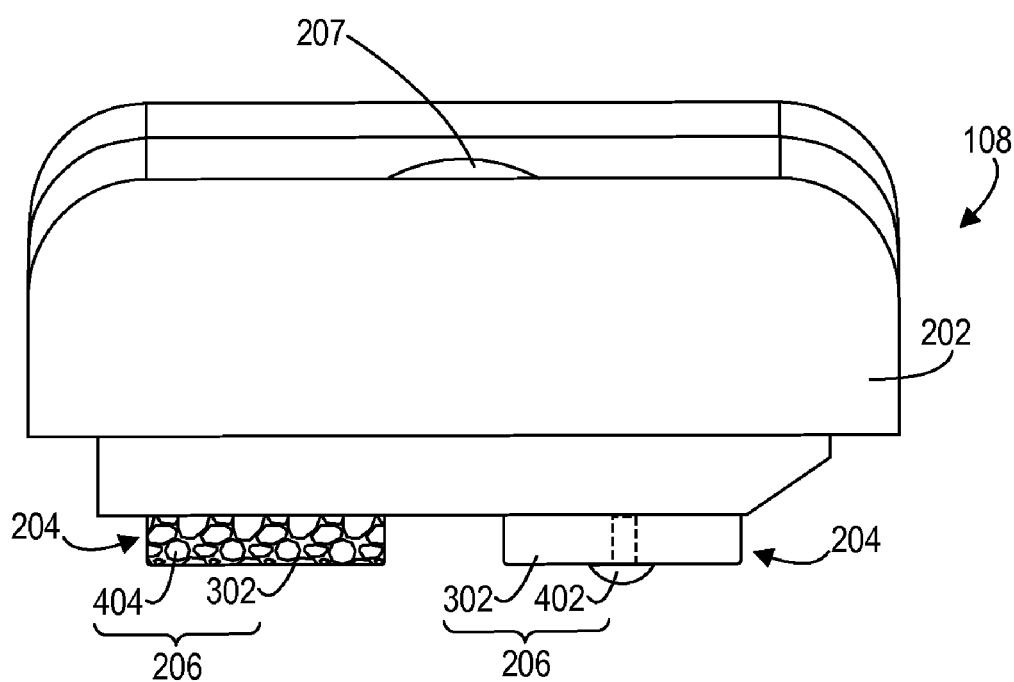
FIG. 4 is a cross-sectional view of alternative embodiments of an electrically conductive magnet in which a magnet includes a conductive fastener and in which a magnet is impregnated with a conductive material to provide conductive paths through the magnets to the power consumption device according to various embodiments described herein.
Figure 5:
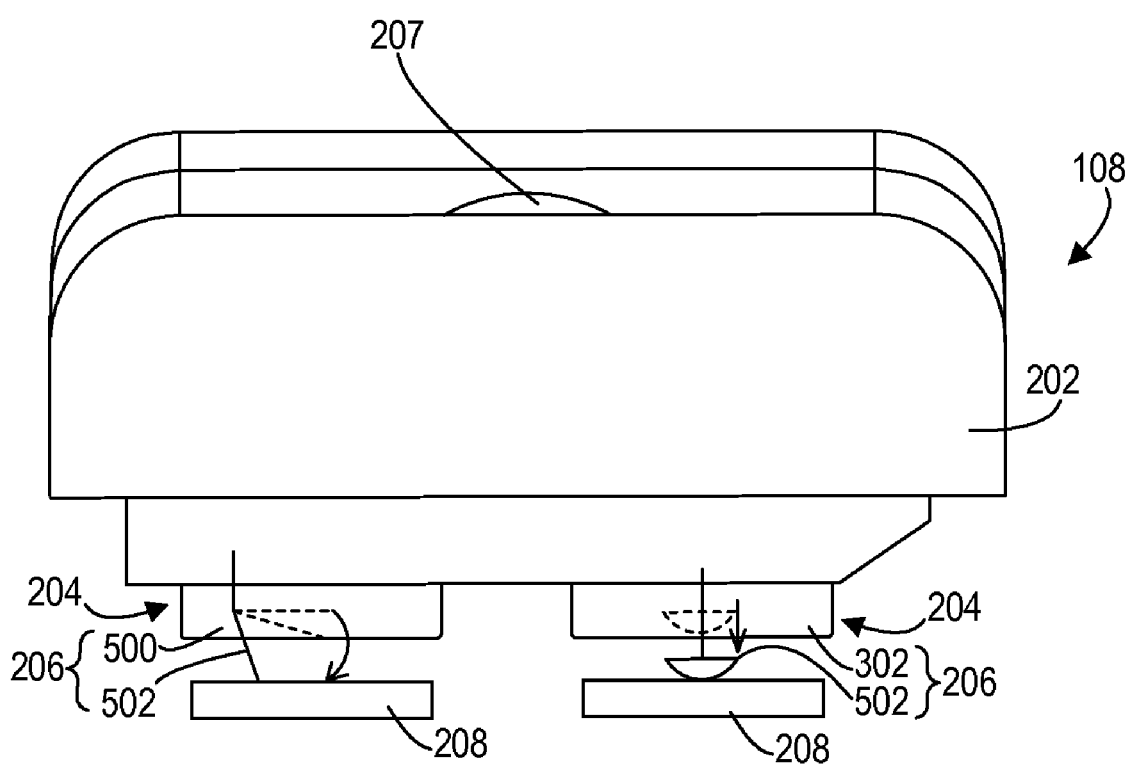
FIG. 5 is a cross-sectional view of an alternative embodiment of an electrically conductive magnet that includes a retractable conductive magnetic contact that extends from a magnet cover to provide a conductive path to the power consumption device according to various embodiments described herein.

Turning now to FIGS. 3-5, cross-sectional views of the LED light strip 108 will be discussed to illustrate various embodiments for providing a conductive magnet 206. According to the embodiment shown in FIG. 3, the power receiving coupling mechanism 204 includes two conductive magnets 206. It should be appreciated that any number of conductive magnets 206 may be used without departing from the scope of this disclosure. Each conductive magnet 206 includes a magnet 302 and a conductive coating 304. The magnet 302 may be a rare earth magnet, a permanent magnet, a ceramic magnet, an electromagnet, or any other type of magnetic material. The strength of the magnets should be sufficient to ensure a connection of the power supply component 102 and the power consumption component 104 that will support the weight of the power consumption component 104 if the conductive magnetic coupling system 100 is mounted on a wall or ceiling, while allowing for removal of the power consumption components 104 without requiring a person to use excessive force to break the magnetic connection. According to one embodiment, the magnet 302 is a neodymium magnet.

The conductive coating 304 encompassing the magnet 302 can be any conductive material of sufficient thickness that will not interfere with the magnetic connection of the magnet 302 and that will properly provide a conductive path for routing an electrical signal and/or a data signal between the power distribution coupling mechanism 208 and the power consumption device 202. According to one embodiment, the conductive coating is a nickel coating. It should be appreciated that the conductive coating 304 may completely encompass the magnet 302 so that none of the magnet 302 is exposed, or it may only partially encompass the magnet 302 while providing a conductive path around and/or through the magnet 302. The conductive coating 304 is electrically connected to the circuitry within the power consumption device 202 for operating the LED assemblies 207.

FIG. 4 illustrates two alternative embodiments of the conductive magnets 204. The first alternative embodiment utilizes conductive magnets 204 that include a magnet 302 and a conductive fastener 402. Rather than utilizing a conductive coating 304 to provide a conductive path between the power distribution coupling mechanism 208 and the power consumption device 202, this configuration provides for a conductive fastener 402 used to secure the magnet 302 to the consumption device 202 and to provide for the conductive path for routing electrical and/or data signals. As an example, the conductive fastener 402 may be a rivet that when installed, has an exposed head that contacts the tracks 210 or other power distribution coupling mechanism 208. The side of the rivet that is opposite the head is connected to the circuitry within the power consumption device 202 to power and route data to and from the LED assemblies 207.

The second alternative embodiment shown in FIG. 4 utilizes conductive magnets 204 in which the conductive magnets 204 are impregnated with a conductive material 404 of sufficient density that allows the magnet 302 to provide the conductive path for the electrical and/or data signals passing between the power distribution coupling mechanism 208 and the power consumption device 202. In this embodiment, a conductive coating 304 or a conductive fastener 402 is not utilized since the magnet itself allows for electrical continuity between the tracks 210 and the circuitry within the LED light strip 108.

FIG. 5 shows yet another alternative embodiment in which the conductive magnet 206 includes a magnet cover 500 with a retractable conductive magnetic contact 502 embedded within. The retractable conductive magnetic contact 502 is biased in a retracted position recessed within the magnet cover 500. When exposed to a magnetic field of a conductive magnetic track 210A or 210B, or of any other magnetic power distribution coupling mechanism 208, the retractable conductive magnetic contact 502 is configured to extend from the magnet cover 500 until contact is made with the power distribution coupling mechanism 208 to provide a conductive path to the power consumption device 202 for an electrical and/or data signal. The retractable conductive magnetic contact 502 may include a magnet 302 with a conductive coating 304 or a magnet 302 that is impregnated with a conductive material 404, as described above.

FIG. 5 shows two embodiments in which the retractable conductive magnetic contact 502 extends from the magnet cover 500. In the first, the retractable conductive magnetic contact 502 rotates out of the magnet cover 500 to contact the magnetic power distribution coupling mechanism 208. In the second, the retractable conductive magnetic contact 502 extends axially downward out of the magnet cover 500 to contact the magnetic power distribution coupling mechanism 208. In both embodiments, the retractable conductive magnetic contact 502 maintains contiguous contact with a conductive component connected to the circuitry within the power consumption device 202.

It should be clear from this description of the conductive magnets 204 that each magnet 302 and the corresponding conductive coating 304, conductive fastener 402, and/or impregnated conductive material 404 of the various embodiments form a single, bonded component that functions both as a binding mechanism and a conductive mechanism for magnetically and communicatively coupling the power consumption component 104 to the power supply components 102 of the conductive magnetic coupling system 100. This differs from any conventional use of magnets used to bond electrical components in which a magnet is used to hold components together in a position that allows electrical pins to align on the components to be attached. In a conventional application, the magnets and the electrical contacts are separate entities. The electrical contacts on the mating components must align and be held in place, which is accomplished using a magnet. In contrast, the conductive magnets 204 serve as both the bonding agent and the electrical contact. They may be positioned anywhere along the power distribution coupling mechanism 208 since there are no pins or contacts that require alignment. Rather, the electrical and/or data signals traverse the tracks 210 to any location in which the conductive magnets 204 are attached.

Figure 6:
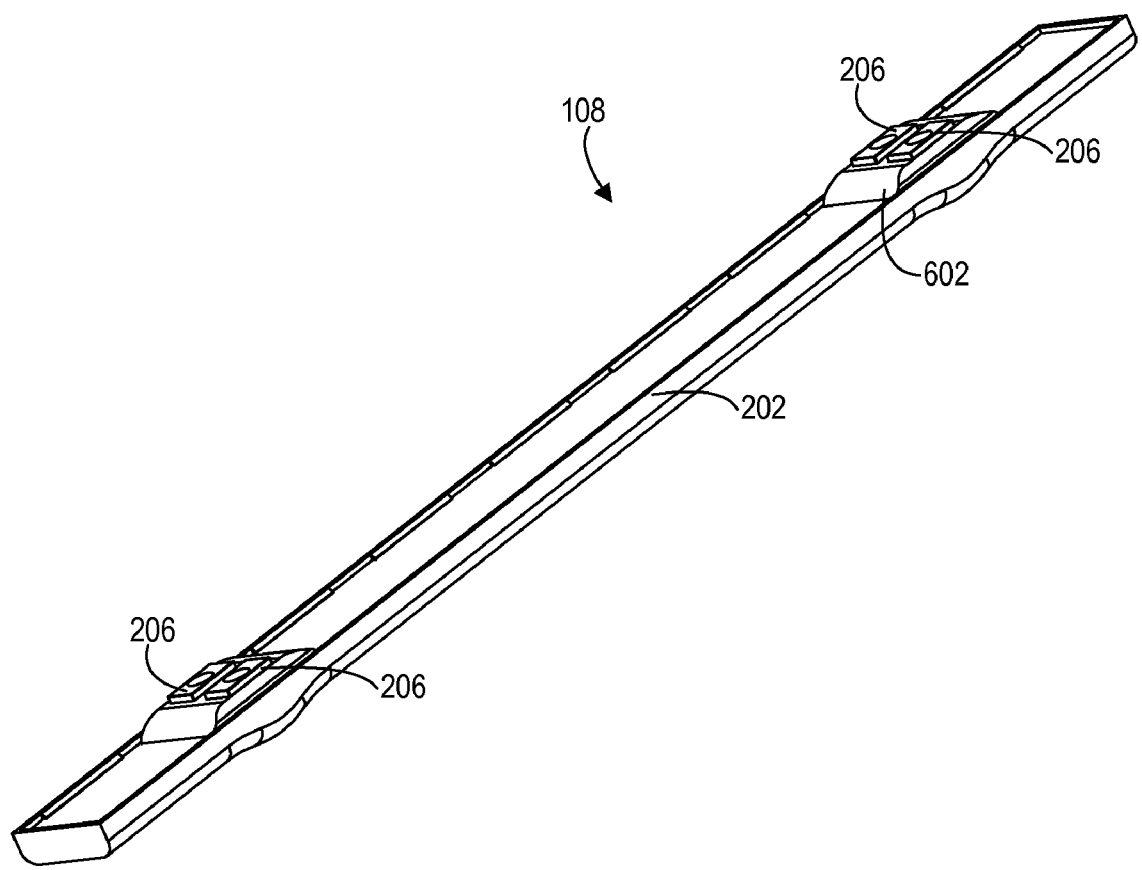
FIG. 6 is a perspective view of a bottom side of a power consumption component showing electrically conductive magnets for coupling and receiving an electrical signal according to various embodiments described herein.
Figure 7:
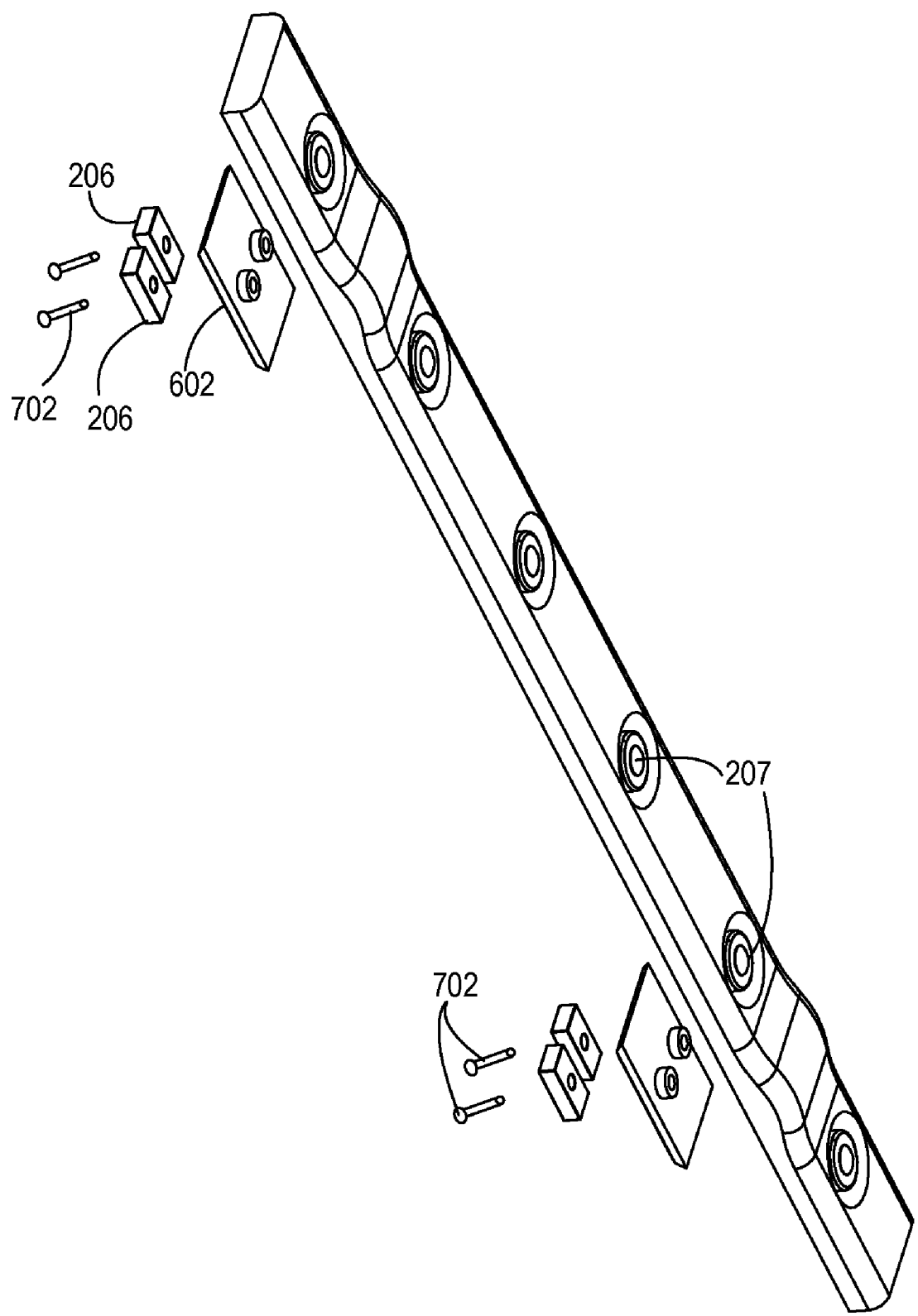
FIG. 7 is an exploded view of the power consumption component of FIG. 6 according to various embodiments described herein.

Turning now to FIGS. 6 and 7, perspective bottom and exploded views, respectively, illustrate the various components of a LED light strip 108 according to embodiments of the disclosure presented herein. The LED light strip 108 includes a number of LED assemblies 207 electrically connected to two sets of conductive magnets 206. While the LED light strip 108 is shown to include two sets of adjacent conductive magnets 206, it should be appreciated that any number of conductive magnets 206 may be used. According to one embodiment, approximately half of the LED assemblies 207 are provided with electrical and/or data signals via one pair of conductive magnets 206, while the second pair of conductive magnets routes power and/or data signals to and from the other half of the LED assemblies. According to another embodiment, each conductive magnet 206 that is configured to connect to the same track 210 provides electrical and/or data signals to the same pole of the circuit within the power consumption device 202 containing the LED assemblies 207.

Magnet spacers 602 are used to elevate the power consumption device 202 with respect to the conductive magnets 206 to create an air gap between the LED light strip 108 and the tracks 210. This air gap assists in the thermal management of the power consumption device 202. Similarly, the conductive magnets 206 operate as a heat sink to route heat from the LED assemblies 207 to the tracks 210. The air gap may additionally prevent any short circuit situations with respect to conductive contact with the tracks 210. As seen in FIG. 7, rivets 702 or other fasteners may be used to secure the power consumption device 202, the magnet spacers 602, and the conductive magnets 206 together. Alternatively, any other bonding means such as adhesive and various welding techniques may be used.

Figure 8:
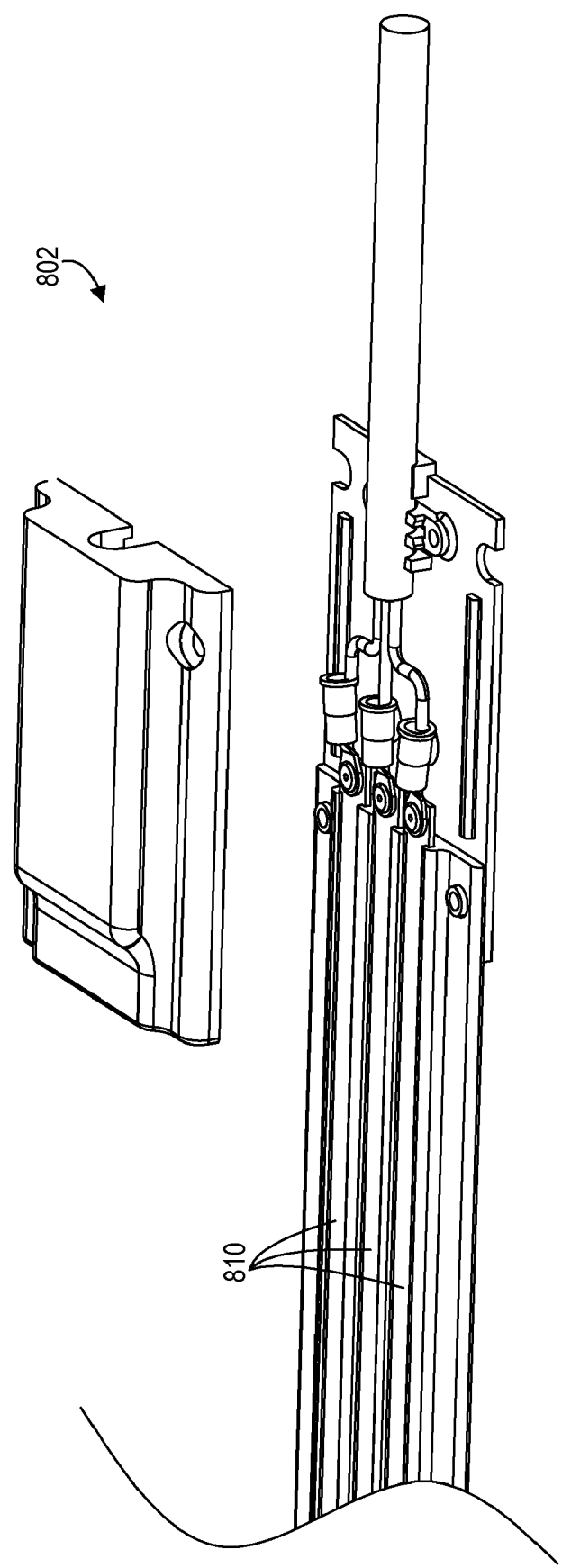
FIG. 8 is a partially exploded perspective view of a 3-channel conductive magnetic coupling system according to various embodiments described herein.

FIG. 8 shows a track system 802 in which the power supply component 102 includes three tracks 810, instead of the two tracks 210 described above. By utilizing a third track 810, a data channel may be included in addition to the two electrical channels. This third channel facilitates modulation operations with the LED light strip 108. Various modulation techniques, including, but not limited to, pulse-width modulation, pulse-shape modulation, pulse code modulation, parallel pulse code modulation, and bit angle modulation techniques may be used to control the dimming of the LED assemblies 207.

Moreover, data may be transmitted between the power and control module 110 and the LED assemblies 207 to create an intelligent lighting system that optimizes light output according to any number of LED and environmental parameters. The power and control module 110 may include all the microprocessors and other components that drive the intelligent lighting systems. By modularizing this controller in a similar manner as the power consumption component 104, the power and control module 110 may be easily replaced to fix a damaged module or to modify the capabilities of the power and control module 110. The pulse width modulation operations and intelligent lighting system are described in the co-pending patent applications referenced above and entitled, "MANAGING SSL FIXTURES OVER PLC NETWORKS," "ENERGY MANAGEMENT SYSTEM," and "ILLUMINATION DEVICE AND FIXTURE," each of which is expressly incorporated by reference herein in its entirety.

Figure 9:
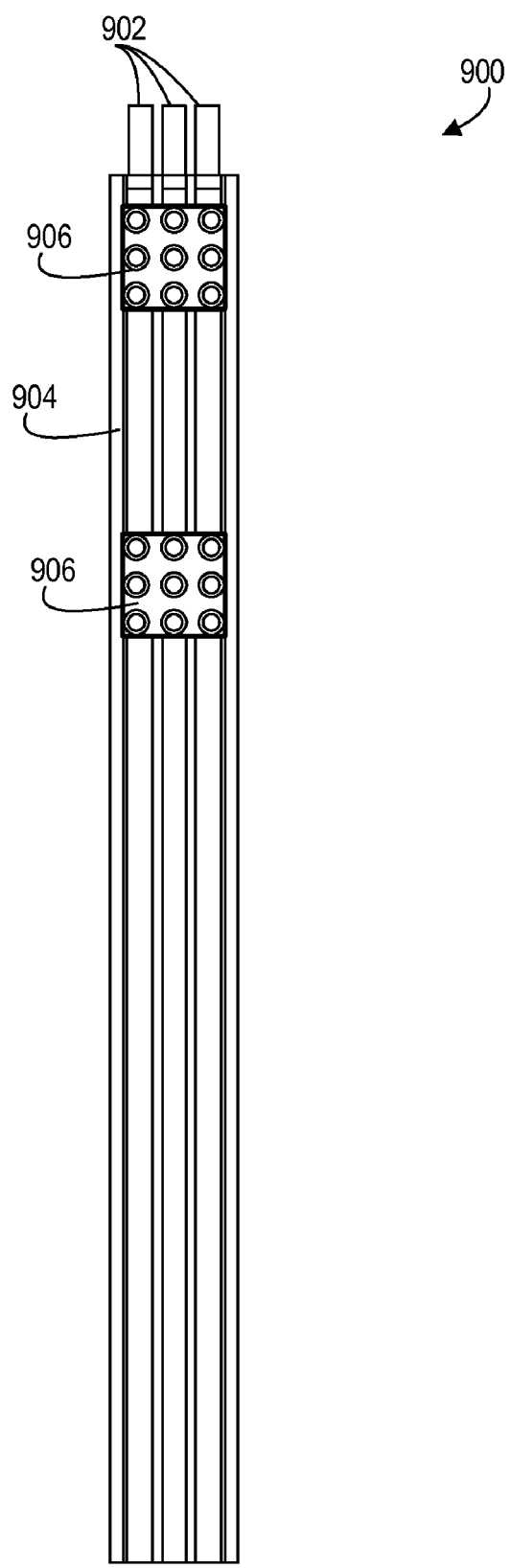
FIG. 9 is a plan view of a conductive magnetic coupling system showing power consumption components coupled to a flexible insulator encompassing a number of parallel electrical conductors according to various embodiments described herein.
Figure 10:
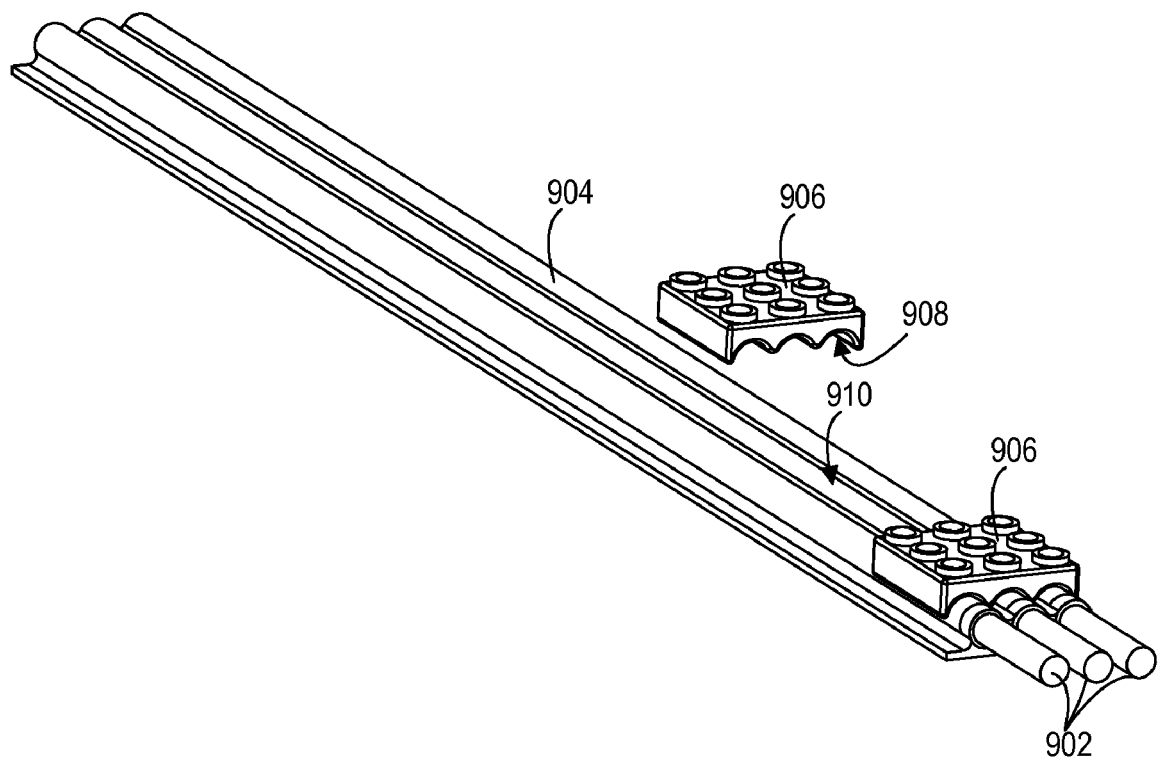
FIG. 10 is a partially exploded perspective view of the conductive magnetic coupling system of FIG. 9 according to various embodiments described herein.

FIGS. 9 and 10 show plan and perspective views, respectively, of a conductive magnetic coupling system 900 that utilizes a number of parallel electrical conductors 902 encompassed with a flexible insulator 904. The flexible insulator 904 acts as a flexible "track" similar to the track system 106 described above. The flexible insulator 904 is made from a flexible material that provides at least a partially impermeable fluid barrier to the parallel electrical conductors 902 for weatherproofing. Doing so allows for the conductive magnetic coupling system 900 to be suitable for outdoor applications, such as lighting on or around a porch, deck, pool deck, or landscaping. The conductive magnetic coupling system 900 allows for any number of luminary modules such as LED arrays 906, or any other types of solid state luminary or other power consumption devices 202, to be magnetically attached to the flexible track at any desired location. To provide an electrical and/or data signal to an attached power consumption device 202, the device is against the track such that penetration devices on a rear side of the power consumption device 202 penetrate the flexible insulator 904 and contact the parallel electrical conductors 902 to provide a conductive path for the electrical and/or data signals.

According to this embodiment, the power consumption device 202 described above is implemented as one or more LED arrays 906 that may be magnetically connected and electrically coupled to the parallel electrical conductors 902. The LED arrays 906 may include any number of LED assemblies 207 arranged in any desired configuration. It should be understood that with any of the embodiments presented herein, the power consumption device 202 may include any number of LED assemblies 207 arranged in any configuration, including but not limited to, a single LED assembly 207, a linear strip of LED assemblies 207, one or more groupings of LED assemblies 207, or a large panel of LED assemblies 207. In this manner, LED light "bulbs" may be created that replicate the size and shape of conventional incandescent and fluorescent bulbs. In the implementation shown in FIGS. 9-11B, the LED arrays 906 include a shaped surface 908 that is shaped to nest with the complimentarily shaped surface 910 of the flexible insulator 904. The shaped surfaces 908 and 910 include channels that are shaped correspondingly with the cylindrical shape of the parallel electrical conductors 902.

Looking at FIGS. 11A and 11B, the power distribution coupling mechanism 208 and the power receiving coupling mechanism 204 of the conductive magnetic coupling system 900 will be described in further detail. As discussed above, the power distribution coupling mechanism 208 includes the parallel electrical conductors 902. It should be appreciated that the conductive magnetic coupling system 900 may include two parallel electrical conductors 902, three parallel electrical conductors 902, or any number of parallel electrical conductors 902 according to the desired power and/or control signals utilized within the conductive magnetic coupling system 900. The parallel electrical conductors 902 may include steel cable or any conductive cable. The parallel electrical conductors 902 may be coated, such as a steel cable coated with copper, or a copper cable coated with steel. The precise materials and properties of the parallel electrical conductors 902 can be modified according to the design criteria of the specific application for the conductive magnetic coupling system 900.

Figure 11A:
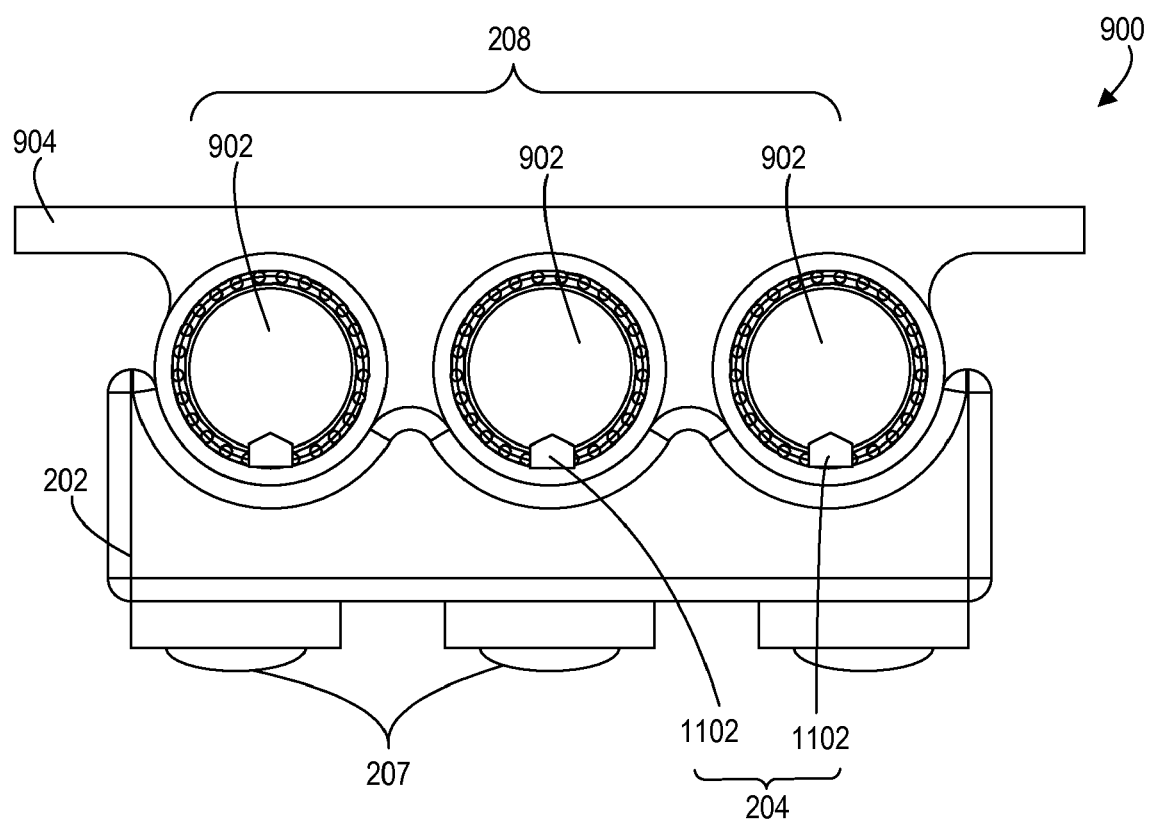
FIG. 11A is a cross-sectional view of a power consumption component coupled to a power supply component showing a number of insulator penetration devices penetrating the flexible insulator and contacting the parallel electrical conductors according to various embodiments described herein.
Figure 11B:
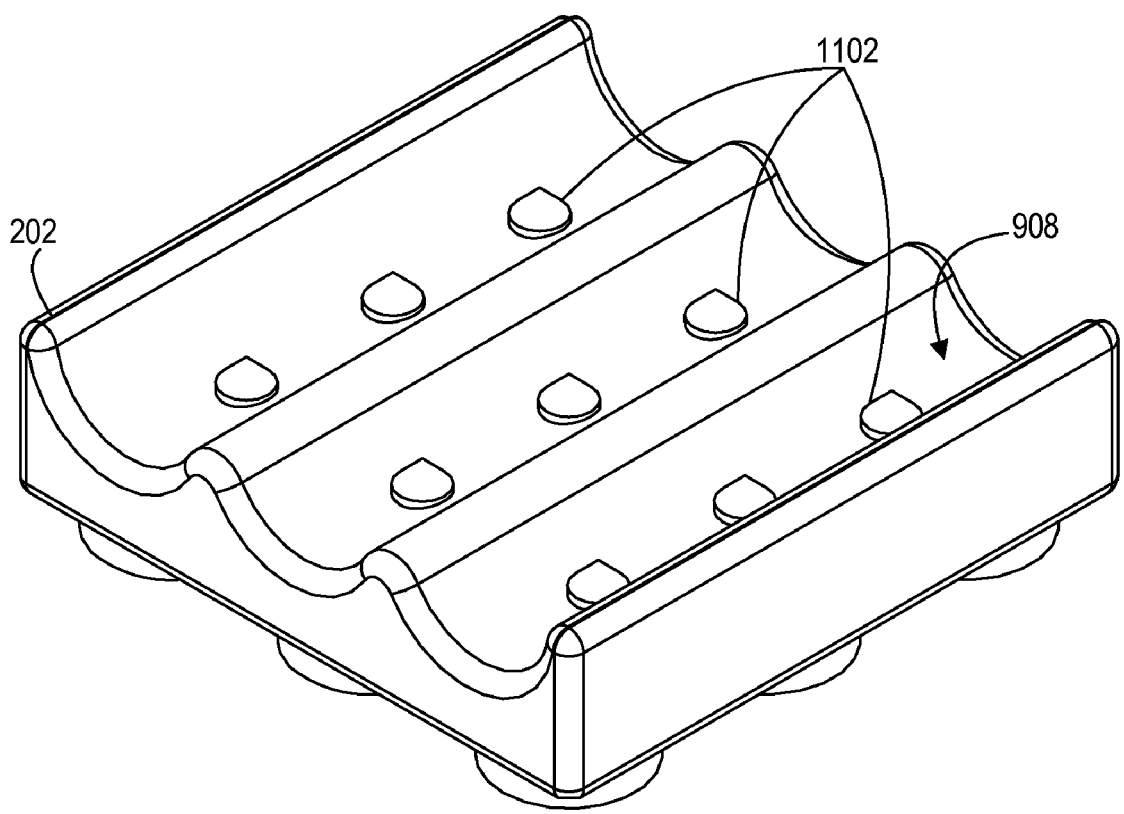
FIG. 11B is a perspective view of the bottom side of the power consumption component of FIG. 11A showing the insulator penetration devices according to various embodiments described herein.

As seen in FIGS. 11A and 11B, the power consumption device 202, or the LED array 906 according to the illustrated implementation, includes a number of insulator penetration devices 1102, which operate as the power receiving coupling mechanism 204. The insulator penetration devices 1102 may be conductive pins that are configured to transport electrical and/or data signals to the LED assemblies 207 from the parallel electrical conductors 902. In order to create a conductive path for the electrical and/or data signals, the insulator penetration devices 1102 are pressed through an outer surface of the flexible insulator 904 and into the parallel electrical conductors 902. The flexible insulator 904 should be a material having characteristics that allow it to provide an impermeability from fluids to protect the parallel electrical conductors 902 from the elements, allow for penetration by the insulator penetration devices 1102 with minimal effort, and sufficiently resilient to deform back into place in order to fill the holes in the flexible insulator 904 created by the penetration devices 1102 when the LED arrays 906 are pulled out for relocation or replacement. An example would be a flexible insulator 904 created from a suitable rubber compound.

To hold the LED arrays 906 in place, either before or after the installation of the insulator penetration devices 1102, magnets may be used to pull the LED arrays 906 toward the parallel electrical conductors 902. According to one implementation, the insulator penetration devices 1102 are conductive magnets similar to the conductive magnets 206 described above. According to another implementation, magnets are incorporated into the power consumption device 202 separately from the insulator penetration devices 1102.

Figure 12A:
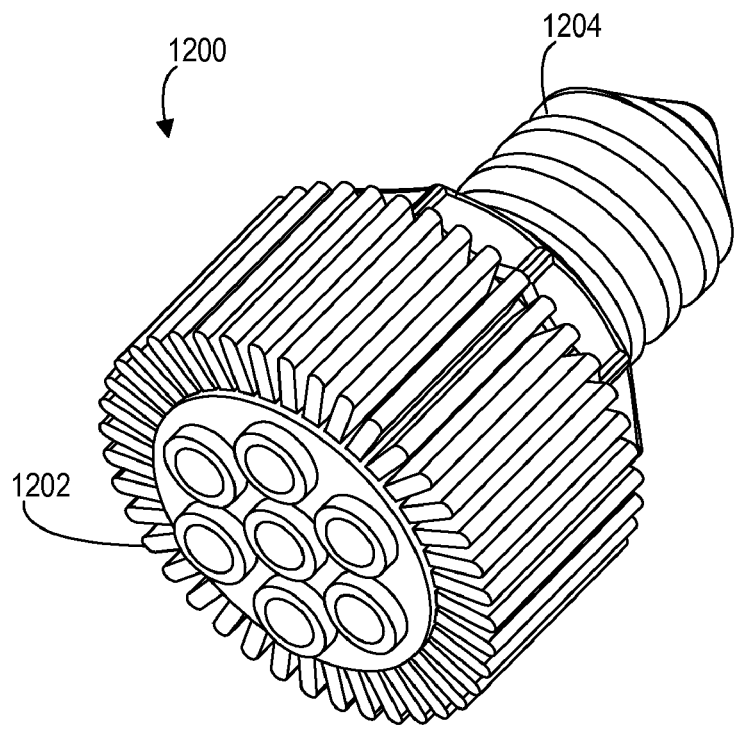
FIGS. 12A-12C are perspective views of a conductive magnetic coupling system for coupling a power consumption component to an Edison screw base component according to various embodiments described herein.
Figure 12B:
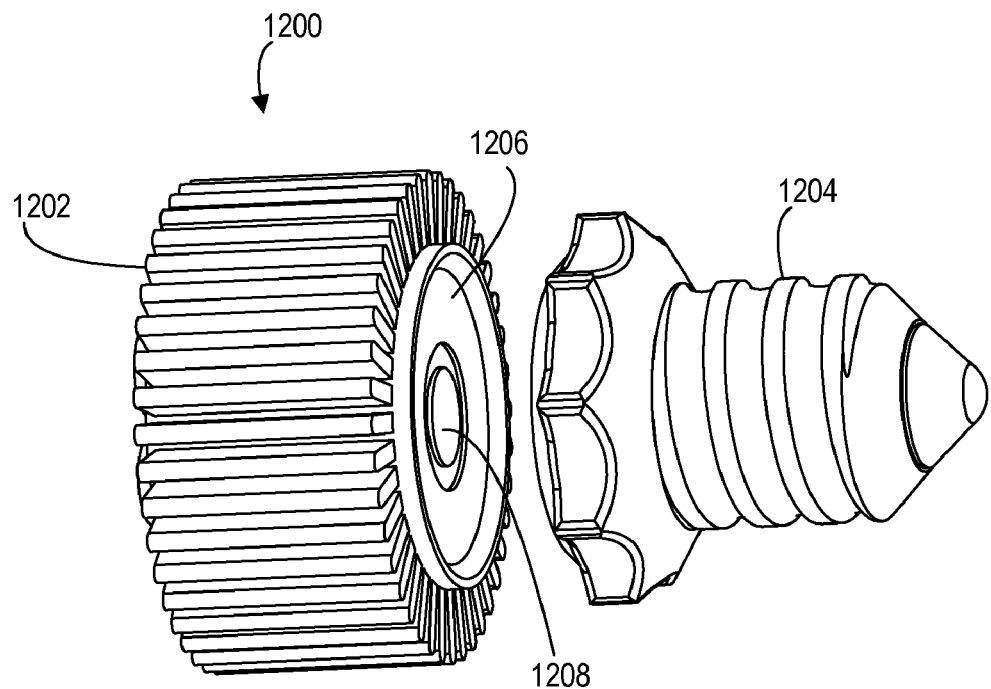
Figure 12C:
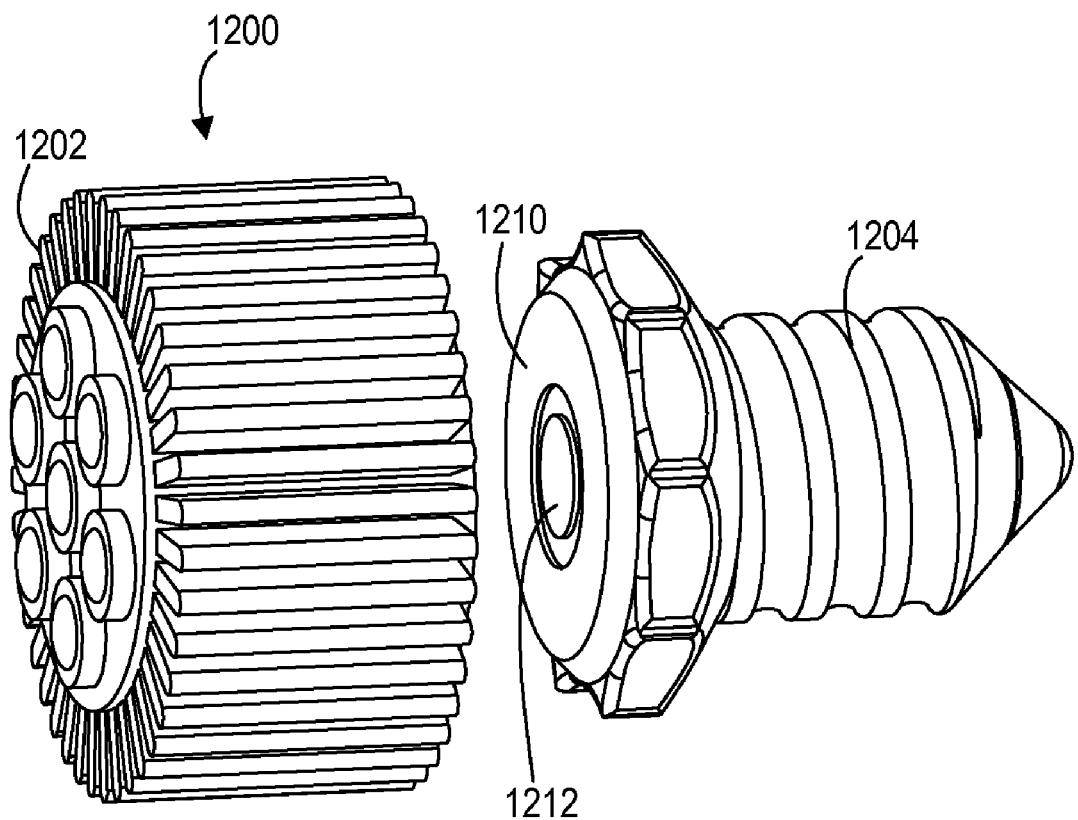

Turning to FIGS. 12A-12C, a conductive magnetic coupling system 1200 will be described in which the power consumption component 104 is implemented as an LED bulb array 1202 and the power supply component 102 is implemented as an Edison screw base component 1204. In this configuration, the Edison screw base component 1204 may include a power supply, and any type of communications and control circuitry. The power receiving coupling mechanism 204 is implemented as an outer ring receiving magnet 1206 and an inner ring receiving magnet 1208, equivalent to the two conductive magnets 206A and 206B described above with respect to the conductive magnetic coupling system 100 above. Similarly, the power distribution coupling mechanism 208 is implemented as an outer ring distribution magnet 1210 and an inner ring distribution magnet 1212, equivalent to the two tracks 210A and 210B described above. All of the concepts and features described above with respect to the conductive magnets 206 and tracks 210 apply to the outer and inner receiving magnets 1206 and 1208 and the outer and inner distribution magnets 1210 and 1212. Additional features of an LED illumination system according to the configuration shown in FIGS. 12A-12C are described in co-pending U.S. patent application Ser. No. 12/408,463, entitled "ILLUMINATION DEVICE AND FIXTURE," which has been incorporated by reference herein in its entirety.

Based on the foregoing, it should be appreciated that technologies for a conductive magnetic coupling system are provided herein. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A conductive magnetic coupling system, comprising:
a power supply component comprising
a power distribution coupling mechanism configured to detachably connect to a power consumption component and to provide an electrical signal to the power consumption component; and
the power consumption component comprising
a power receiving coupling mechanism configured to detachably connect to the power distribution coupling mechanism and to receive the electrical signal from the power distribution coupling mechanism, and
a power consumption device comprising a solid state luminary module configured to receive the electrical signal from the power receiving coupling mechanism and to convert the electrical signal to light output,
wherein at least one of the power distribution coupling mechanism and the power receiving coupling mechanism comprises an electrically conductive magnet such that the electrically conductive magnet is configured for detachably connecting the power distribution coupling mechanism and the power receiving coupling mechanism and configured to transfer the electrical signal between the power distribution coupling mechanism and the power receiving coupling mechanism.

2. The system of claim 1, wherein the electrically conductive magnet comprises a magnet coated with a conductive material.

3. The system of claim 2, wherein each of the power distribution coupling mechanism and the power receiving coupling mechanism comprises a magnet coated with a conductive material.

4. The system of claim 3, wherein the magnet coated with the conductive material of the power distribution coupling mechanism and the magnet coated with the conductive material of the power receiving coupling mechanism are configured such that a polarity alignment of each magnet allows for the detachable connection of the power consumption component to the power supply component in a first configuration that provides a desired path for the electrical signal between the power distribution coupling mechanism and the power receiving coupling mechanism and prevents a connection of the power consumption component to the power supply component in a second configuration in which the power consumption component is rotated 180 degrees with respect to the power supply component in the first configuration.

5. The system of claim 1, wherein the electrically conductive magnet comprises a magnet secured to the power distribution coupling mechanism or the power receiving coupling mechanism with a conductive fastener such that the conductive fastener transfers the electrical signal between the power distribution coupling mechanism and the power receiving coupling mechanism.

6. The system of claim 1, wherein the electrically conductive magnet comprises a magnet impregnated with conductive material such that a conductive path is provided through the magnet for transporting the electrical signal.

7. The system of claim 1, wherein the power distribution coupling mechanism comprises a track system comprising a plurality of parallel tracks configured to allow the power receiving coupling mechanism to be detachably connected at any position along a length of the plurality of parallel tracks.

8. The system of claim 7, wherein the track system comprises two tracks and wherein the power receiving coupling mechanism comprises at least one electrically conductive magnet configured to engage each of the two tracks.

9. The system of claim 7, wherein the plurality of parallel tracks comprise a flexible insulator encompassing a plurality of electrical conductors and wherein the power receiving coupling mechanism comprises a plurality of magnetic insulator penetration devices configured to penetrate the flexible insulator and contact the plurality of parallel electrical conductors to provide a conductive path between the power supply component and the power consumption component.

10. The system of claim 1, wherein the power distribution coupling mechanism and the power receiving coupling mechanism are configured to transfer the electrical signal and a data signal.

11. The system of claim 1, wherein the power distribution coupling mechanism comprises an Edison screw fitting.

12. The system of claim 1, wherein the power consumption device comprises a light-emitting diode (LED) strip or a LED array.

13. The system of claim 7, wherein the power receiving coupling mechanism comprises a plurality of electrically conductive magnets disposed from the power consumption device such that an air gap exists between the power consumption device and the plurality of parallel tracks when each of the electrically conductive magnets engages each of the parallel tracks.

14. The system of claim 13, wherein the plurality of electrically conductive magnets are further configured to route heat from the power consumption device to the plurality of parallel tracks.

15. The system of claim 1, wherein the electrical signal comprises one of a pulse-width modulated signal, a pulse-shape modulated signal, a pulse-code modulated signal, a parallel pulse-code modulated signal, and a bit-angle modulated signal.

16. A conductive magnetic coupling system, comprising:
a power supply component comprising
a plurality of parallel tracks, each track comprising an electrically conductive and magnetically connectable material configured to provide an electrical signal to a power consumption component magnetically connected to the power supply component at any location along a length of the tracks; and
the power consumption component comprising
a power receiving coupling mechanism comprising a plurality of magnets coated with a conductive material such that each magnet is configured to detachably connect to one of the parallel tracks, receive the electrical signal from the track, and transfer the electrical signal to a power consumption device, wherein a coupling length of the power receiving coupling mechanism is smaller than the length of the plurality of parallel tracks and the power receiving coupling mechanism is configured to magnetically connect to the plurality of parallel tracks at any position along the length of the plurality of parallel tracks, and a power consumption device comprising a solid state luminary module configured to receive the electrical signal from the power receiving coupling mechanism and convert the electrical signal to light output, wherein the electrical signal comprises one of a pulse-width modulated signal, a pulse-shape modulated signal, a pulse-code modulated signal, a parallel pulse-code modulated signal, and a bit-angle modulated signal.

17. The system of claim 16, wherein the plurality of parallel tracks are further configured to provide a data signal to the power consumption component.

18. A conductive magnetic coupling system, comprising:
a power supply component comprising
    a plurality of parallel electrical conductors, and
    a flexible insulator encompassing the plurality of parallel electrical conductors; and a power consumption component comprising
    at least one insulator penetration device configured to penetrate the flexible insulator and contact the plurality of parallel electrical conductors, and to provide a conductive path between the plurality of parallel electrical conductors and a power consumption device electrically connected to the at least one insulator penetration devices, and
    the power consumption device comprising a solid state luminary module configured to receive an electrical signal from the plurality of parallel electrical conductors via the plurality of insulator penetration devices and to convert the electrical signal to light output; and
a magnetic coupling system configured to magnetically secure the power consumption component to the power supply component.

19. The system of claim 18, wherein the flexible insulator is configured to provide an impermeable barrier to fluids such that the flexible insulator provides a weatherproof barrier to the plurality of electrical conductors.

20. The system of claim 19, wherein the plurality of parallel electrical conductors comprises a magnetically connectable material, and wherein magnetic coupling system comprises a plurality magnetic insulator penetration devices.

* * * * *